United States Patent
Kuroda (10) Patent No.: US 8,793,069 B2
(45) Date of Patent: Jul. 29, 2014

(54) OBJECT RECOGNITION SYSTEM FOR AUTONOMOUS MOBILE BODY

(75) Inventor: Mitsuhide Kuroda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 777 days.

(21) Appl. No.: 12/385,257

(22) Filed: Apr. 2, 2009

(65) Prior Publication Data

US 2009/0254235 A1  Oct. 8, 2009

(30) Foreign Application Priority Data

Apr. 3, 2008 (JP) .................................. 2008-97291

(51) Int. Cl.
*G05D 1/00* (2006.01)

(52) U.S. Cl.
USPC ............ 701/519; 700/245; 700/250; 700/253

(58) Field of Classification Search
CPC ....... G06T 7/20; G06T 7/2006; G06T 7/2013; G06T 7/202; G06T 7/2026; G06T 7/2033; G06T 7/204; G06T 7/2053; G06T 7/206; G06T 7/2066; G06T 7/208; G06T 7/2086; G06T 7/2093; G06K 9/00771; G06K 9/00778; G06K 9/00805; G01S 13/66; G01S 13/68; G01S 13/72; G01S 13/726
USPC .......... 701/301, 519; 700/245, 250, 255, 253, 700/258, 259; 318/568.11, 568.23, 568.16; 342/104, 107; 348/169; 382/103, 107
See application file for complete search history.

(56) References Cited

U.S. PATENT DOCUMENTS 6,011,494 A * 1/2000 Watanabe et al. ........ 340/995.14
6,173,215 B1 * 1/2001 Sarangapani ................. 700/255
(Continued)

FOREIGN PATENT DOCUMENTS

JP  53-016230  2/1978
JP  09-326032  12/1997
(Continued)

OTHER PUBLICATIONS

Zecca et al., Emotion Expression Humanoid Robot WE-4RII, 2006, Head Robot Team/Takanishi Laboratory, http://www.takanishi.mech.waseda.ac.jp/top/research/we/we-4rII/index.htm.*

(Continued)

*Primary Examiner* — Thomas Black
*Assistant Examiner* — Sara Nelson
(74) *Attorney, Agent, or Firm* — Squire Patton Boggs (US) LLP (57) ABSTRACT

The present invention provides an object recognition system for an autonomous mobile body. The object recognition system includes a sensor unit for detecting an obstacle in a target field of view and measuring the position of the obstacle, and an electronic control unit for controlling movement of the autonomous mobile body. The electronic control unit performs the functions of determining a velocity and a travel direction of the obstacle based on changes in the position of the obstacle obtained from the sensor unit over a plurality of measurement cycles, determining a still state of the obstacle, detecting that the obstacle has changed behavior if a current measured value of position of the obstacle deviates a predetermined angle from the previously measured travel direction or if it is determined that the obstacle is standing still, and calculating, when a change in the behavior of the obstacle is detected, the velocity and travel direction of the obstacle anew starting at the position where the change has been detected.

7 Claims, 5 Drawing Sheets

(56) References Cited

U.S. PATENT DOCUMENTS

| | | | |
|---|---|---|---|
| 6,380,986 B1* | 4/2002 | Minami et al. | 348/699 |
| 6,529,806 B1* | 3/2003 | Licht | 701/23 |
| 6,539,284 B2* | 3/2003 | Nourbakhsh et al. | 700/245 |
| 6,917,855 B2* | 7/2005 | Gonzalez-Banos et al. | 700/245 |
| 7,444,214 B2* | 10/2008 | Cho et al. | 701/23 |
| 7,504,987 B2* | 3/2009 | Oka et al. | 342/70 |
| 7,532,109 B2* | 5/2009 | Takahama et al. | 340/436 |
| 8,019,475 B2* | 9/2011 | Kuroda | 700/255 |
| 8,204,679 B2* | 6/2012 | Nakamura | 701/301 |
| 8,577,126 B2* | 11/2013 | Jones et al. | 382/154 |
| 2002/0159637 A1* | 10/2002 | Echigo et al. | 382/190 |
| 2003/0035051 A1* | 2/2003 | Cho et al. | 348/169 |
| 2004/0073368 A1* | 4/2004 | Gonzalez-Banos et al. | 701/301 |
| 2005/0171637 A1* | 8/2005 | Tani et al. | 700/245 |
| 2005/0189471 A1* | 9/2005 | Nagasawa | 250/208.1 |
| 2006/0106496 A1* | 5/2006 | Okamoto | 700/253 |
| 2006/0115113 A1* | 6/2006 | Lages et al. | 382/103 |
| 2007/0274566 A1* | 11/2007 | Fujimoto | 382/103 |
| 2008/0159597 A1* | 7/2008 | Noguchi et al. | 382/107 |
| 2008/0166023 A1* | 7/2008 | Wang | 382/107 |
| 2008/0249662 A1* | 10/2008 | Nakamura | 700/253 |
| 2009/0043440 A1* | 2/2009 | Matsukawa et al. | 701/25 |
| 2009/0173561 A1* | 7/2009 | Moriguchi et al. | 180/167 |
| 2009/0234527 A1* | 9/2009 | Ichinose et al. | 701/23 |
| 2010/0222925 A1* | 9/2010 | Anezaki | 700/253 |
| 2010/0235033 A1* | 9/2010 | Yamamoto et al. | 701/26 |
| 2011/0267460 A1* | 11/2011 | Wang | 348/135 |

FOREIGN PATENT DOCUMENTS

| | | |
|---|---|---|
| JP | 2006-092253 | 4/2006 |
| JP | 2006092253 A * | 4/2006 |

OTHER PUBLICATIONS

Fiorini et al., Motion Planning in Dynamic Environments Using Velocity Obstacles, 1998, International Journal of Robotics Research.*

Pratihar et al, A genetic-fuzzy approach for mobile robot navigation among moving obstacles, 1999, International Journal of Approximate Reasoning.*

Tachi et al., Guide dog robot, 1983, MITI.*

Seder et al., Dynamic window based approach to mobile robot motion control in the presence of moving obstacles, 2007, IEEE.*

Qu et al, A new analytical solution to mobile robot trajectory generation in the presence of moving obstacles, Dec. 2004, IEEE.*

Zhou et al., Object tracking in an outdoor environment using fusion of features and cameras, 2006, Image and Vision Computing.*

Yamamoto et al., Online navigation of mobile robot under the existence of dynamically moving multiple obstacles, 2001, IEEE.*

Weng et al., Video object tracking using adaptive Kalman filter, 2006, ScienceDirect.*

Chroust et al., Improvement of the prediction quality for visual servoing with a switching Kalman filter, 2003, International Journal of Robotics Research.*

Anderson, Average Measurements with the MSC12xx, 2004, Texas Instruments.*

Shetty et al., Image-sensor-based target maneuver detection, 1998, Optical Engineering.*

Chueh et al., Following Controller for Autonomous Mobile Robots Using Behavioral Cues, Jul. 2008, IEEE.*

* cited by examiner

OBJECT RECOGNITION SYSTEM FOR AUTONOMOUS MOBILE BODY

BACKGROUND OF THE INVENTION

1. Field of the Invention

The present invention relates to an object recognition system attached to an autonomous mobile body.

2. Description of the Related Art

Japanese Patent Application Publication No. 53-16230 describes a vehicle collision avoidance system which evaluates danger by detecting distance and relative velocity to an obstacle using a radar, in which when a signal reflected from the obstacle becomes weak making it no longer possible to detect the obstacle, the vehicle collision avoidance system evaluates danger by estimating the distance and relative velocity to the obstacle based on information obtained so far.

Japanese Patent No. 3866328 describes an object recognition system which identifies a three-dimensional object based on a distribution of distance to an obstacle around a vehicle, determines relative position between the vehicle and obstacle, erases the obstacle when the relative position goes out of a predetermined area around the vehicle, memorizes any newly detected obstacle, and determines the likelihood of contact with the vehicle. Since position of the detected obstacle is updated when the vehicle travels, if the same obstacle is detected multiple times, the obstacle is mistaken as multiple obstacles, limiting the movement of the vehicle.

Japanese Patent Application Publication No. 2006-92253 describes an autonomous mobile system which, even when there are multiple obstacles, makes avoidance decision by determining a travel direction and other conditions of the obstacle nearest to the autonomous mobile system without associating the obstacles with each other. The autonomous mobile system determines the travel direction of the obstacle by discrediting a direction component of velocity along two axis in a travel direction of the autonomous mobile system and a direction orthogonal to the travel direction into three values—positive, zero, and negative values—and adding values of past n frames in forward and backward directions as well as in right and left directions.

A robot which travels autonomously at office or home is required to travel without coming into collision with obstacles such as human beings or other robots which behave in a manner similar to human beings. Human beings travel slowly, at uneven speeds. Also, human beings tend to stop or change direction suddenly. In such an environment, the robot needs to determine a travel path by avoiding collisions with obstacles such as the human beings. The technique disclosed in Japanese Patent Application Publication No. 2006-92253 cannot deal with uneven movement of obstacles such as the human beings.

SUMMARY OF THE INVENTION

In environments such as described above, an object recognition system for an autonomous mobile body is required to deal with uneven movement of obstacles such as human beings.

To solve the above problem, the present invention provides an object recognition system comprising a sensor unit which can detect an obstacle in a target field of view and can measure position of the obstacle, and an electronic control unit which controls movement of the autonomous mobile body, wherein the electronic control unit is programmed to perform the functions of determining a velocity and a travel direction of the obstacle based on changes in the position of the obstacle obtained from the sensor unit over a plurality of measurement cycles, to determine a still state of the obstacle, and to detect that the obstacle has changed behavior if a current measured value of position of the obstacle deviates a predetermined angle from the previous travel direction measured before or if the function of determining a still state determines that the obstacle is standing still. The electronic control unit is further programmed to calculate, when a change in the behavior of the obstacle is detected, the velocity and travel direction of the obstacle anew starting at position where the change has been detected.

According to one aspect of the present invention, the electronic control unit is programmed to perform the functions of determining a travel range in which an obstacle can travel from position of the previous measurement until the current measurement, based on position information about the obstacle obtained from the sensor unit; and determining, if an obstacle is detected in the travel range by the current measurement, that the obstacle detected this time is identical to the obstacle detected the previous time.

According to another aspect of the present invention, the electronic control unit is programmed to perform the function of determining that the obstacle is standing still if difference between position of the obstacle measured the previous time and position of the obstacle measured this time is equal to or smaller than a predetermined value, based on the position information about the obstacle obtained from the sensor unit.

According to still another aspect of the present invention, the travel direction of the obstacle is an average over a plurality of measurement cycles.

According to one aspect of the present invention, it is determined that a sudden change of direction has been made if the obstacle moves out of a range of plus and minus 90 degrees from the travel direction.

According to still another aspect of the present invention, it is determined that the obstacle has made a sudden change of direction if the position of the obstacle suddenly changes direction, at least in two measurement cycles, from a position at which the obstacle is located before the two measurement cycles.

According to one aspect of the present invention, the travel range is determined by multiplying velocity of the obstacle to a measurement time interval.

According to another aspect of the present invention, the autonomous mobile body is a humanoid robot and the obstacle is a human being.

According to one aspect of the present invention, the travel range is determined assuming that the velocity of the obstacle is from 0 to a possible velocity of a human being.

BRIEF DESCRIPTION OF THE DRAWINGS

FIGS. 2(*a*) and (*b*) are diagrams showing an example of the Minkowski sum.

FIGS. 3(*a*) and (*b*) are diagrams showing how a extended interference zone M is generated by sweeping an interference zone C.

DETAILED DESCRIPTION OF THE PREFERRED EMBODIMENT

Next, an embodiment of the present invention will be described with reference to the drawings. In the present embodiment, a humanoid robot is taken as an example of an autonomous mobile body. Such a robot is equipped with a built-in electronic control unit (ECU), which controls behavior of the robot. Basically, the ECU is a computer which includes a processor (CPU), random access memory (RAM) which provides a working area for the CPU, read-only memory (ROM) which stores computer programs and data, input interface which receives signals from sensors installed in various parts of the robot and processes the signals, and output interface which sends drive signals to actuators in various parts of the robot. The present invention adds new functions to such an electronic control unit.

Figure 1:
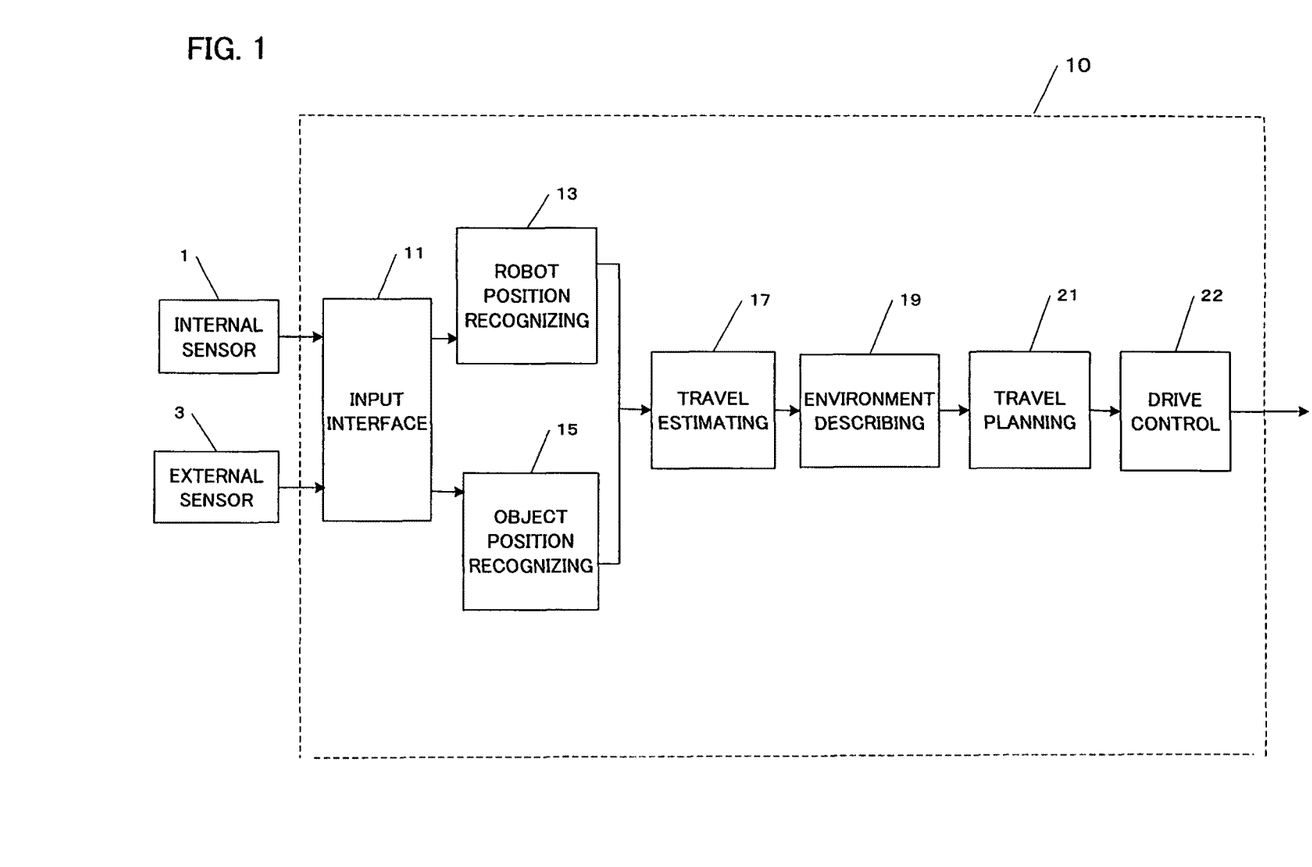
FIG. 1 is a functional block diagram showing an overall configuration of an object recognition system according to the present invention.

FIG. 1 is a functional block diagram of an ECU 10 equipped with the functions added by the present invention. Signals from an internal sensor 1 and an external sensor 3 incorporated in the robot are sampled and subjected to A/D (analog/digital) conversion by the input interface 11, and then sent to a robot position recognizing unit 13 and object position recognizing unit 15, respectively.

The internal sensor 1 may include an encoder, gyro, acceleration sensor, or the like. In the field of robotics, it is a common practice to estimate an amount of change in travel within a reference time using signals obtained by such sensors, time-integrate the amount of change, and thereby calculate a total amount of travel from an initial position. This technique is known as a dead reckoning method. The robot position recognizing unit 13 estimates position and travel velocity of the robot in an absolute coordinate system by the dead reckoning method based on the signals from the internal sensor 1. The robot position recognizing unit observes feature points (landmarks) in an external environment based on signals from the external sensor 3 and can identify the robot position by checking the robot position against an environmental map possessed by the robot (stored in the ROM or RAM).

The external sensor 3 may include a CCD camera, ultrasonic sensor, or laser range finder. According to the present embodiment, the external sensor 3 is a stereoscopic camera. The object position recognizing unit 15 processes image data from the external sensor 3 and detects and extracts obstacles in images. The detected obstacles are approximated by graphics such as rectangles and ellipses in subsequent data processing. According to the present embodiment, a visual field of the stereoscopic camera has the shape of a sector 90 degrees wide and 9 meters deep. A technique which calculates a distance to each pixel in the visual field based on the image data obtained by a stereoscopic camera and extracts obstacles from a background image based on the calculated distances is well-known in the present field. A technique which determines an optical flow based on two or more images with delay periods between them and extracts moving obstacles from a background image based on the optical flow is also well-known in the art. The object position recognizing unit 15 extracts an obstacle from the visual field of the camera using such a technique.

A travel estimating unit 17 determines the positions of the robot and detected obstacle in the absolute coordinate system using position information about the detected obstacle provided by the object position recognizing unit 15 and position information about the robot provided by the robot position recognizing unit 13. In so doing, the travel estimating unit 17 compares the position of the detected obstacle obtained at the time ($t_0$) of the current measurement with the position obtained at the time ($t_{-1}$) of the previous measurement, and determines that the obstacle detected at the time ($t_0$) of the current measurement is identical to the obstacle detected at the time ($t_{-1}$) of the previous measurement if difference between the two positions falls within a predetermined range.

When a humanoid robot is used in an office, an obstacle moving in the environment is a human being or another robot. Generally, possible velocity v of a human being in an office ranges from 0 km/h standing still to 8 km/h. A moving range of the human being within a measurement interval $\Delta t = t_0 - t_{-1}$ is within a radius of $v\Delta t$ from the position of the human being at time $t_{-1}$. According to the present embodiment, assuming that travel velocity of human beings is v km/h (e.g., 4 km/h, which is an average travel velocity of human beings in an office), if the position of a human being detected at time $t_0$ is within a radius of $v\Delta t$ from the position of a human being detected at time $t_{-1}$, the travel estimating unit 17 determines that the two human beings (obstacles) are identical.

The travel estimating unit 17 determines the travel velocity and travel direction of a human being in the field of view of the robot A based on the positions of the human being at the time ($t_{-1}$) of the previous measurement and at the time ($t_0$) of the current measurement. If the human being is standing still, the travel estimating unit 17 sets the velocity of the human being to zero.

An environment describing unit 19 generates a interference zone and extended interference zone based on information about the detected obstacle—i.e., position, shape, velocity, and travel direction—recognized by the travel estimating unit 17 as well as robot position information obtained by the robot position recognizing unit 13, travel velocity specified by a program, and predetermined robot shape.

Figure 2:
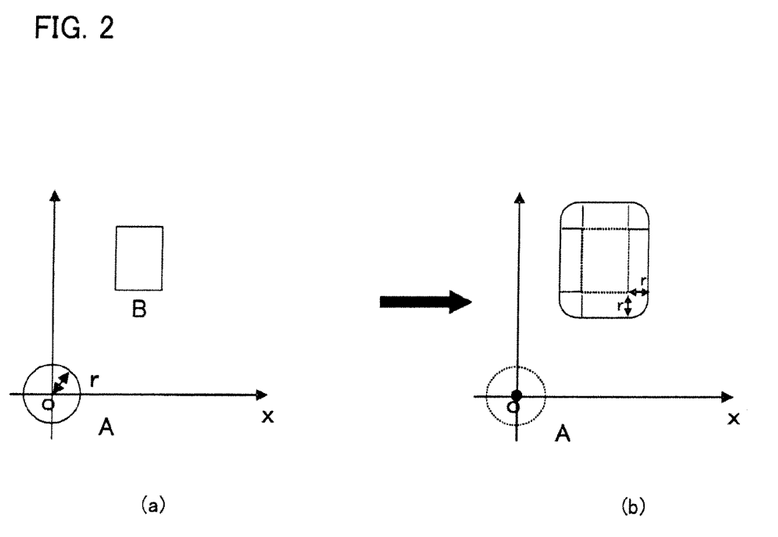

FIGS. 2(a) and 2(b) show detected position in a coordinate system by approximating the shape of the robot A by a circle of radius r and approximating a detected obstacle B by a rectangle, with the current position of the robot A being located at a coordinate origin. An interference zone C of the obstacle B is determined using the Minkowski sum of the circle of radius r which represents the robot A and the rectangle which represents the detected obstacle B. The Minkowski sum is known logic and is given by the following equation.

$$A \oplus B \equiv \{a+b | a \in A, b \in B\} \quad (1)$$

Figure 3:
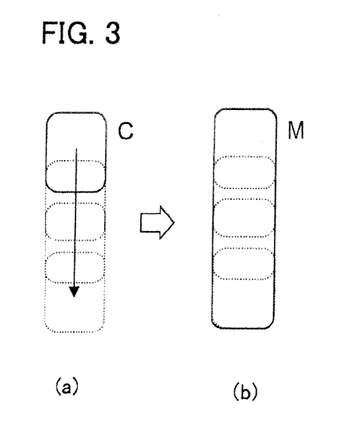

As illustrated in FIG. 3(a), an extended interference zone M is obtained by extending or sweeping the interference zone C in the travel direction of the obstacle B such as a robot or human being that is the detected obstacle. Referring to FIG. 3(b), the extended interference zone M is an area in which the obstacle B moves in the detected travel direction within a predetermined time period and is obtained by sweeping the interference zone C in the travel direction of the obstacle B. The predetermined time period is the time (estimated travel time) required for the robot A to reach the position of the obstacle B while the extended interference zone M is the area in which the obstacle B is expected to travel in the time period. The estimated travel time T is given by the following equation.

$$T=(\text{distance from robot } A \text{ to obstacle } B)/(\text{relative velocity of } A \text{ and } B) \quad (2)$$

The extended interference zone is obtained by extending the interference zone in the travel direction of the obstacle B by "the velocity of the obstacle B×T."

Figure 4:
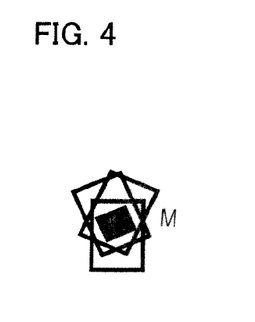
FIG. 4 is a diagram showing how the extended interference zone M fluctuates if the extended interference zone M is generated with too high sensitivity.

FIG. 4 illustrates vibration of the extended interference zone when detected data for the obstacle B is too sensitive.

Figure 5:
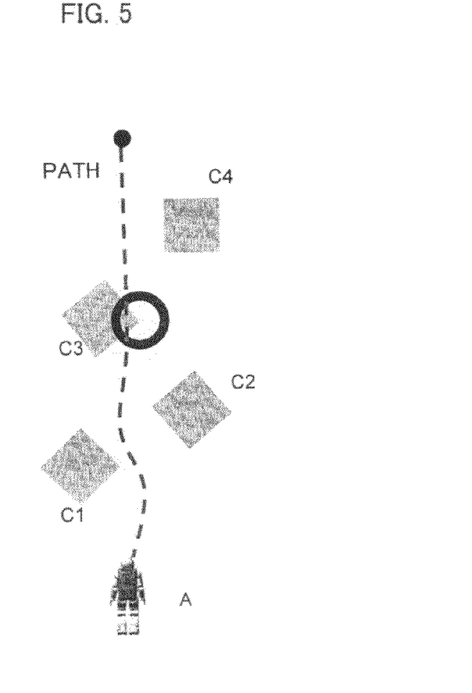
FIG. 5 is a diagram showing an example of relationship between interference zones C1 to C4 and a path of a robot A.
Figure 6:
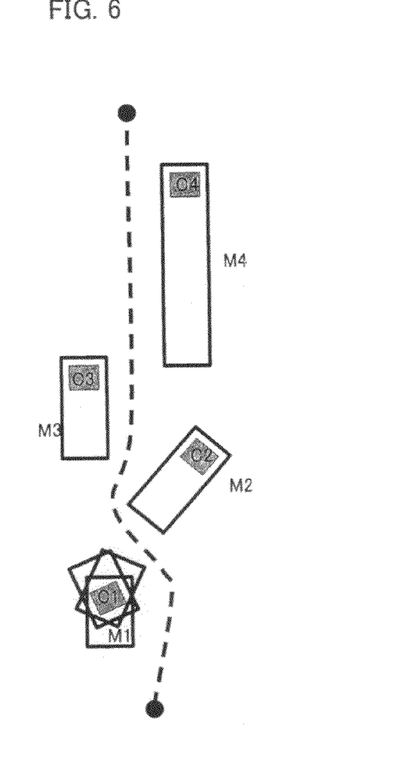
FIG. 6 is a diagram showing an example of relationship between extended interference zones M1 to M4 and the path of the robot A.

A travel planning unit 21 generates a path along which the robot A will travel to a destination point. Referring to FIG. 5, when the robot A is traveling along a set path, the travel planning unit 21 determines whether the set path interferes with interference zones C1 to C4 generated at time ($t_{-1}$) of measurement. In the example of FIG. 5, the path interferes with the interference zone C3 as indicated by a circle. In such a case, the travel planning unit 21 generates a path which will not interfere with extended interference zones M1 to M4 of the obstacle B, as shown in FIG. 6. If a path is not set at time ($t_{-1}$) of measurement, the travel planning unit 21, using a similar method, generates a path for the destination point that has initially been set.

Figure 7:
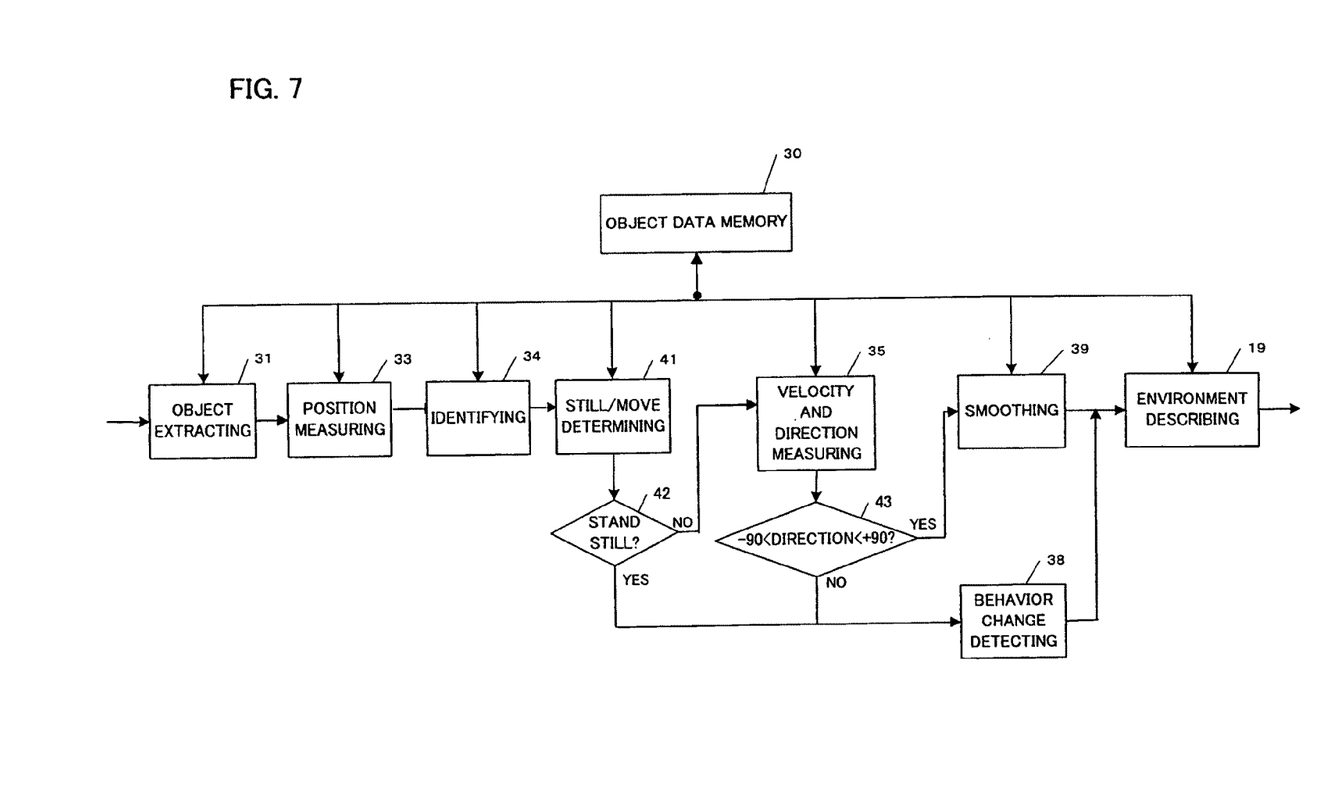
FIG. 7 is a detailed functional block diagram of an object position recognizing unit 15 and travel estimating unit 17 in FIG. 1.
Figure 8:
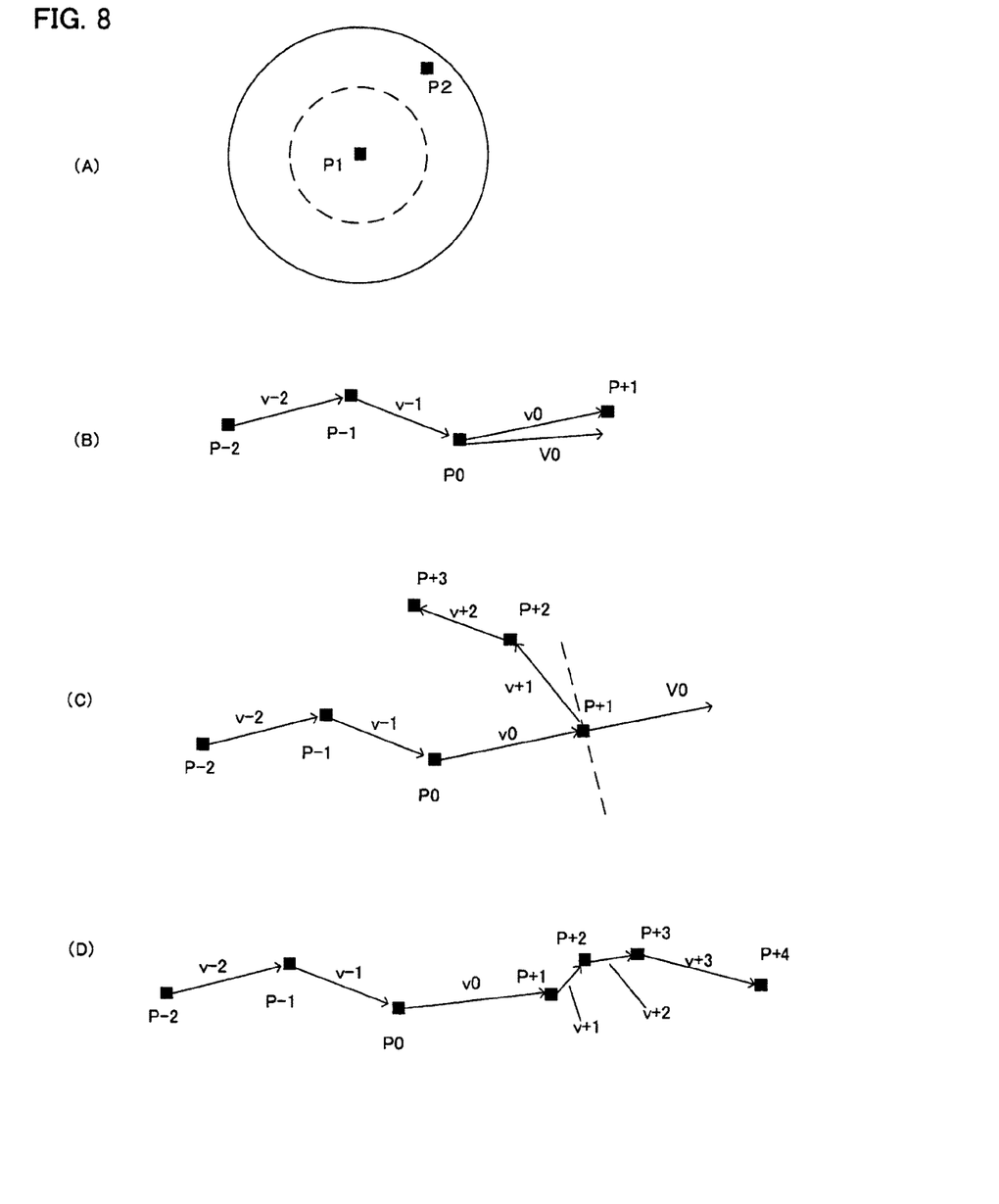
FIGS. 8A to 8D are diagrams showing still state and travel state of a robot A.

FIG. 7 is a detailed functional block diagram of the object position recognizing unit 15 and travel estimating unit 17 in FIG. 1. An object extracting unit 31 extracts an obstacle, a human being or a robot, from image data obtained from the external sensor 3. Then, a position measuring unit 33 measures the position of the extracted obstacle. Position data resulting from the measurement is stored in an object data memory 30. If an obstacle detected at time ($t_0$) of the current measurement is located within a radius of vΔt from the position of an obstacle detected at time ($t_{-1}$) of the previous measurement (where v is the travel velocity of the obstacle and Δt is the measurement interval, i.e., $t_0-t_{-1}$), an identifying unit 34 determines that the obstacle detected this time is identical to the obstacle detected the previous time and stores the position data by associating the position data with the obstacle detected previously. In FIG. 8(A), solid line circle indicates a corresponding circle. The circle is drawn by taking Minkowski sum of the obstacle B and the same obstacle as obstacle B, position P1 being its center. That is, the radius of obstacle B is doubled to form a circle. Still/move determining unit 41 may determine that the obstacle at position P2 in the solid circle is identical to the obstacle previously located at position P1.

Referring to FIG. 8(A), if the obstacle previously located at position P1 is currently located in the circle drawn with a dotted line around P1, the still/move determining unit 41 determines that the obstacle is standing still (block 42).

In computations for the determination, the range described above can be determined by statistically determining measurement error of the position and adding measurement error to determine the range. For example, the range can be determined by adding estimation error of the obstacle's velocity and image processing error. According to the present embodiment, the measurement error is assumed to be 16 cm. If the determination in block 42 is negative, meaning that the obstacle has moved, a velocity and direction measuring unit 35 calculates the velocity and direction of the obstacle in each measurement (sampling).

The travel direction of an obstacle is calculated from change in the position of the obstacle over a predetermined number of measurement cycles. The travel direction is calculated as a direction in a two-dimensional coordinate system according to a map stored in the memory of the robot A. The calculated travel direction is stored in the object data memory 30 in association with the detected obstacle.

Now, functions of a smoothing unit 39 will be described with reference to FIG. 8(B). The smoothing unit 39 calculates a smoothed travel velocity and travel direction of the obstacle as a moving average of the velocity values calculated by the velocity and direction measuring unit 35 over a predetermined number of measurement cycles. The velocity and direction data thus smoothed is sent to the environment describing unit 19 (described with reference to FIG. 1) and used by the environment describing unit 19 to calculate the interference zone and the extended interference zone of the obstacle. The smoothing is done using, for example, the following equation.

$$V_0 = ( \ldots + a_{-2}v_{-2} + a_{-1}v_{-1} + a_0v_0)/N$$

where "$V_0$" is a smoothed velocity vector, "v" is a velocity vector of the obstacle at the time of measurement, "a" is a weighing factor which can be set to a larger value for newer data. Alternatively, the same value of "a" may be used for velocities at all times.

FIG. 8(B) illustrates a condition in which a velocity vector v0 for the obstacle moving to position P+1 deviates from the velocity vector V0 that is obtained by smoothing the data before position P0.

Referring to FIG. 8(C), V0 is the smoothed velocity vector at position P+1. At the time of next sampling, if it is detected that the obstacle has moved to P+2, determination block 43 determines whether or not velocity vector v+1 from P+1 to P+2 is within plus 90 degrees and minus 90 degrees with respect to the direction of the smoothed velocity vector V0. If v+1 is within this range, the process goes to the smoothing unit 39. If v+1 is not within this range, calculation of a smoothed vector V+1 by the smoothing unit 39 is suspended. And, if the difference between velocity vector v+2 at position P+3 and velocity vector v+1 at P+2 is within a predetermined range such as between plus 20 degrees and minus 20 degrees, the process goes to a behavior change detecting unit 38. Thus, reliability of the data is verified before proceeding to the next process.

If the determination in the determination block 43 is No, the behavior change detecting unit 38 detects that the obstacle has changed its travel direction at an acute angle. Consequently, the behavior change detecting unit 38 deletes travel data of the obstacle before position P+1 from the object data memory 30 so as not to use the travel data in subsequent computation of velocities and directions. That is, the velocity and direction of the obstacle is computed anew starting at position P+1. This can be done after verifying reliability of data by performing sampling several times at the same position.

This is done because when an obstacle changes its direction abruptly, for example to a reverse direction, smoothing velocities would not make sense and would produce unreliable data.

Now, referring to FIG. 8(D), when position P+2 is located at such a distance from position P+1 that the obstacle is regarded to be standing still, the velocity and direction measuring unit 35 stops moving to block 43, and thereby makes the smoothing unit 39 suspend calculation of the smoothed velocity vector V+1. Next, the velocity and direction measuring unit 35 determines whether the next position P+3 is in a still range from position P+1. If position P+3 is in a still range, the velocity and direction measuring unit 35 resets the travel data of the obstacle before that time and calculates subsequent velocity vectors v starting at P+3. That is, when the obstacle comes to stand still, since its subsequent movements have little relevance to earlier movement, subsequent computation is performed starting at the still point.

Based on the determination in block 43, the behavior change detecting unit 38 sends a "sudden change" signal to the environment describing unit 19. Based on the sudden change signal, the travel planning unit 21 in FIG. 1 draws up a travel plan of the robot. In the next measurement cycle, the velocity and direction measuring unit 35 starts calculating the travel speed and travel direction of the obstacle anew starting at the position of the obstacle at time ($t_0$) of measurement and using subsequent position data.

At office or home, movement of human beings tends to be casual and tend to include irregular actions of turning around and stopping. Human beings often move in a direction entirely different from the previous direction or at a velocity entirely different from the previous velocity. Therefore, according to the present invention, when the travel direction of an obstacle changes suddenly, subsequent travel velocities and travel directions are calculated starting at the position where the direction has changed suddenly.

When the travel direction of an obstacle at time ($t_0$) is in a range of plus and minus 90 degrees from the previous travel direction of the same obstacle, the position data of the obstacle (human being) is stored in the object data memory 30, and the smoothing unit 39 calculates smoothed velocity and travel direction of the obstacle by adding the current position data to the position data in a predetermined number of previous cycles.

A specific embodiment of the present invention has been described above. The present invention is not limited to the embodiment described above.

I claim:

1. An object recognition system provided to an autonomous mobile body, comprising:
   a sensor unit configured to detect an obstacle in a target field of view and measuring a position of the obstacle; and
   an electronic control unit configured to
   control movement of the autonomous mobile body, determine velocity and travel direction of the obstacle based on changes in position of the obstacle obtained from the sensor unit over a plurality of measurement cycles, wherein the travel direction of the obstacle is determined based on a moving average of weighted velocity values of the obstacle over the plurality of measurement cycles, determine a still state of the obstacle,
   detect that the obstacle has changed behavior of the obstacle if a current velocity vector of the obstacle from the preceding position to the current position is out of a predetermined range of an angle from the travel direction that is determined at the preceding position, and
   when a change in the behavior of the obstacle is detected, calculate the velocity and the travel direction of the obstacle anew by not using, in subsequent computation of velocities and directions, travel data of the obstacle obtained before the position where the change has been detected and by starting computation of the velocities and the travel directions from the position where the change has been detected, wherein the travel direction of the obstacle calculated anew is determined based on a moving average of weighted velocity values of the obstacle over a plurality of measurement cycles.

2. The object recognition system according to claim 1, wherein the electronic control unit is further configured to:
   determine a travel range in which an obstacle can travel from the position measured by the sensor unit in a present time, based on positional information of the obstacle obtained from the sensor unit; and
   if an obstacle is detected in said travel range in the present time, determine that the obstacle detected at the present time is identical to the obstacle detected by the sensor unit.

3. The object recognition system according to claim 2, wherein the electronic control unit is further configured to determine that the obstacle is standing still if difference between the position of the obstacle measured by the sensor unit and position of the obstacle measured at a present time is equal to or smaller than a predetermined value, based on the positional information of the obstacle obtained from the sensor unit.

4. The object recognition system according to claim 2, wherein the function of determining a travel range includes multiplying the velocity of the obstacle to a measurement time interval.

5. The object recognition system according to claim 4, wherein the autonomous mobile body is a humanoid robot and the obstacle is a human being.

6. The object recognition system according to claim 5, wherein the travel range is determined assuming that the velocity of the obstacle is from 0 km/h to 8 km/h.

7. The object recognition system according to claim 1, wherein the electronic control unit is further configured to determine that the obstacle has made a sudden change of direction if the position of the obstacle suddenly changes direction, at least in two measurement cycles, from the position at which the obstacle is located before the two measurement cycles.

* * * * *